March 13, 1945.  C. A. DE GIERS ET AL  2,371,428

REMOTE REGULATION OF ATMOSPHERIC CONDITION

Filed Nov. 8, 1941

Clarence A. de Giers
Arthur Wickesser
INVENTORS

Cooper, Kerr & Dunham
ATTORNEYS

Patented Mar. 13, 1945

2,371,428

UNITED STATES PATENT OFFICE 2,371,428

REMOTE REGULATION OF ATMOSPHERIC CONDITION

Clarence A. de Giers, Forest Hills, and Arthur Wickesser, St. Albans, N. Y., assignors to The Liquidometer Corporation, Long Island City, N. Y., a corporation of Delaware Application November 8, 1941, Serial No. 418,365

2 Claims. (Cl. 236—86)

This invention pertains to the regulation of atmospheric condition in a space remote from the point of control. United States Patent No. 1,943,267 to de Giers discloses an instrument for remote indication of temperature, and copending application Serial No. 418,364, filed November 8, 1941, by the present inventors discloses an instrument for remote indication of humidity.

An object of the present invention is to use the teachings of the above mentioned patent and application in an instrument capable, under similar circumstances, of regulating the temperature and humidity instead of simply indicating those conditions.

Further and other objects and advantages will be apparent from the specification and claims, and from the accompanying drawing which illustrates what is now considered to be a preferred embodiment of the invention.

In the drawing:

Figure 1 shows the mechanism of the control device, unessential details being omitted;

Fig. 2 illustrates the single thermometer bulb to be connected to the instrument of Fig. 1 when control of temperature is desired;

Fig. 3 shows wet and dry thermometer bulbs to be connected to the device of Fig. 1 when control of humidity is desired;

Fig. 4 illustrates one type of fluid supply valve; and

Fig. 5 illustrates another type of fluid supply valve and operating means therefor.

For temperature regulation, bulb 10 (Fig. 2) is connected by open-end tube 12 to bellows 14, the bulb and bellows being full of liquid 16.

Another tube 18 with a closed end at the bulb, connects in like manner to bellows 20, a similar to bellows 14, but differently supported.

Bellows 14 and 20 are enclosed in a case 21 having a back plate 22.

Bellows 14 is attached at its outer end to plate 22 by bracket 24. Bellows 20 is attached to plate 22 by a bracket 26 intermediate the ends of the bellows.

The axes of the bellows are parallel but offset, their inner ends being pivotally connected by studs 28 and 30 to opposite ends of a floating link 32. An arm 34, fulcrumed at 36 on plate 22, is pivotally connected by pin 38 to the center of link 32. Mounted on the upper end of arm 34 is a cam roller 40.

This arrangement of offset similar bellows, liquid-filled and connected as shown, by a floating link is effective to prevent movement of arm 34 due to changes of temperature of the bellows or tubes connecting them to bulb 10. However, when a change of temperature occurs in the bulb, liquid 16 therein will expand or contract and some of the liquid will be forced into or out of tube 12, causing bellows 14 to expand or contract axially, thereby swinging lever 34 about its fulcrum 36 through the instrumentality of link 38, the upper pivot of which is stationary.

In the device of the above mentioned de Giers patent, any change of bulb temperature is simply indicated by a pointer, but in the present invention means are provided for adjusting the temperature to a predetermined value, the desired temperature being indicated by a manually adjustable lever 42 in cooperation with a graduated disk 44 on the outside of case 21.

Lever 42 is attached by pin 46 to the outer head of a spindle 48 in axial alignment with bellows 20 and rotatable by lever 42. The inner end of the spindle is threaded at 50 into the head 52 of bellows 20. When the spindle is rotated collars 54 and 56 prevent lengthwise movement of the spindle, thereby causing threads 50 to move bellows head 52 axially, thus either lengthening or shortening bellows 20. Since bellows 20 is filled with incompressible liquid, and is fixedly mounted to the case by bracket 26, the movement of head 52, acting through stud 30, causes a movement of the upper end of link 32, and through pin 38, affects the movement of lever 34 about its fulcrum 36. Spindle 48 is enclosed in a bellows 49 sealed at one end to head 52 and at its other end to the wall of case 21.

Lever 42 is held in its adjusted position by a boss 58 on the lever engaging an appropriate socket 60 in disk 44. A spring 62 holds boss 58 in the selected socket until manual depression of the other end of the lever frees the boss to permit movement to another selected position.

Case 21 is filled with low pressure air supplied through pipe 64. An outlet pipe 66 leads air from case 21 to valve 68 when it is necessary to supply heat to the space containing bulb 10. The inner end of pipe 66 is normally closed by a valve disk 70 against orifice 72. Disk 70 is mounted on a downwardly extending arm 74 of a cam member 76 which is pivoted at 78. The cam member has an arcuate arm 80 extending to the left and an arcuate arm 82 extending to the right.

When bulb 10 is at the desired temperature, as indicated on disk 44, lever 34 and roller 40 are at the positions indicated by full lines in the drawing. If the space temperature rises above the desired temperature, lever 34 swings to the left and roller 40 will roll along the arcuate top of arm 80, the center of which is at 36, thus positively holding disk 70 against orifice 72. Whenever the space temperature drops below the desired normal temperature, lever 34 will swing to the right engaging shoulder 84, thereby rotating the cam assembly about its pivot 78 and opening orifice 72 by moving arm 74 and disk 70 to their dotted line positions, in which positions they are positively maintained by roller 40, rolling along the top of arcuate arm 82 as indicated by the dotted lines. Spring 86 prevents lost motion and back-lash in the cam assembly.

While orifice 72 is open, air passes through pipe 66 into space 90 above diaphragm 88 in valve 68 (Fig. 4), depressing the diaphragm against the resistance of spring 92 and opening valve 94, thus permitting heating fluid to pass through pipes 96, 98, to the space to be heated.

When the space temperature returns to normal, roller 40 will drop off shoulder 84, disk 70 will close orifice 72, valve 94 will close, and the air in space 90, which held the valve open, passes to atmosphere through bleeder valve 100.

Under certain conditions the valve operating mechanism of Fig. 5 may be used. High pressure air entering through pipe 102 and passing through pipe 104 to chamber 106 depresses diaphragm 108 against the resistance of spring 110 and keeps valve 112 closed. Pipe 114 leads to orifice 72 in place of pipe 66, and when disk 70 is moved away from the orifice low pressure air from case 21 passes into bellows 116 and elongates it, causing plunger 118 to move ball 120 from its seat in bushing 122 to seat 124, thereby sealing the inlet from pipe 102 and permitting the air in chamber 106 to exhaust through pipe 104 and around plunger 118, whereupon spring 110 opens valve 112 and allows fluid to pass from pipe 126 through pipe 128 to the space to be heated. When orifice 72 is closed, the air in bellows 116 exhausts through bleeder 130, whereupon the bellows, aided by spring 132, withdraws plunger 118 and the parts resume normal positions as in the drawing.

When the instrument is to be used for regulating humidity instead of temperature, two bulbs are used, one dry and one wet, as indicated in Fig. 3 in which dry bulb 134 is connected by open end tube 136 (in place of tube 12) to bellows 14, and wet bulb 138 is connected by tube 140 (in place of tube 18) to bellows 20. Wet bulb 138 is provided with a wick 142 dipping into water in vessel 144, thus maintaining bulb 138 at a lower temperature than bulb 134, depending upon the humidity of the space atmosphere.

When the humidity drops below normal, the fluid supply valve of Fig. 4 or Fig. 5 is opened as described above in connection with temperature control, the fluid being supplied in spray form to the space enclosing the thermometer bulbs. When the humidity is restored to normal the supply valve is automatically closed.

The device illustrated and described will give sufficiently accurate results for ordinary use, but if the requirements as to accuracy are unusually stringent, the improvements of de Giers Patent No. 2,045,965 may be added to the device herewith illustrated.

It is to be understood that the invention is not limited to the specific embodiment herein illustrated and described, but may be used in other ways without departure from its spirit as defined by the following claims.

What is claimed is:

1. Apparatus of the class described, comprising in combination, a casing, means for maintaining elastic fluid under pressure in said casing, a valve for exhausting elastic fluid from said casing, a pair of differentially connected liquid-filled bellows within said casing, a thermometric device without said casing, means interconnecting said device and one of said bellows whereby the latter will expand or contract according to change of temperature of said device, means under control of said bellows for opening and closing said valve, said valve comprising an orifice and a disk for opening and closing said orifice, said disk being mounted on a pivoted member having means including arcuate arms effective in cooperation with said opening and closing means for positively holding said disk against or away from said orifice, and means controlled by said valve for controlling the temperature at said thermometric device.

2. Apparatus of the class described, comprising in combination, a casing, means for maintaining elastic fluid under pressure in said casing, a valve for exhausting elastic fluid from said casing, said valve having a movable closure member, a pair of bellows within said casing and differentially interconnected by a floating link, a thermometric device without said casing, means interconnecting said device and one of said bellows whereby said one of said bellows will expand or contract according to change of temperature of said thermometric device, means including a lever operable by movement of said link in response to temperature changes for moving the closure member of said valve, said means being provided with two arcuate arms one or the other of which is engageable by said lever for holding said valve positively closed or positively open, and means controlled by said valve for controlling the temperature at said thermometric device.

CLARENCE A. DE GIERS.
ARTHUR WICKESSER.